UNITED STATES PATENT OFFICE.

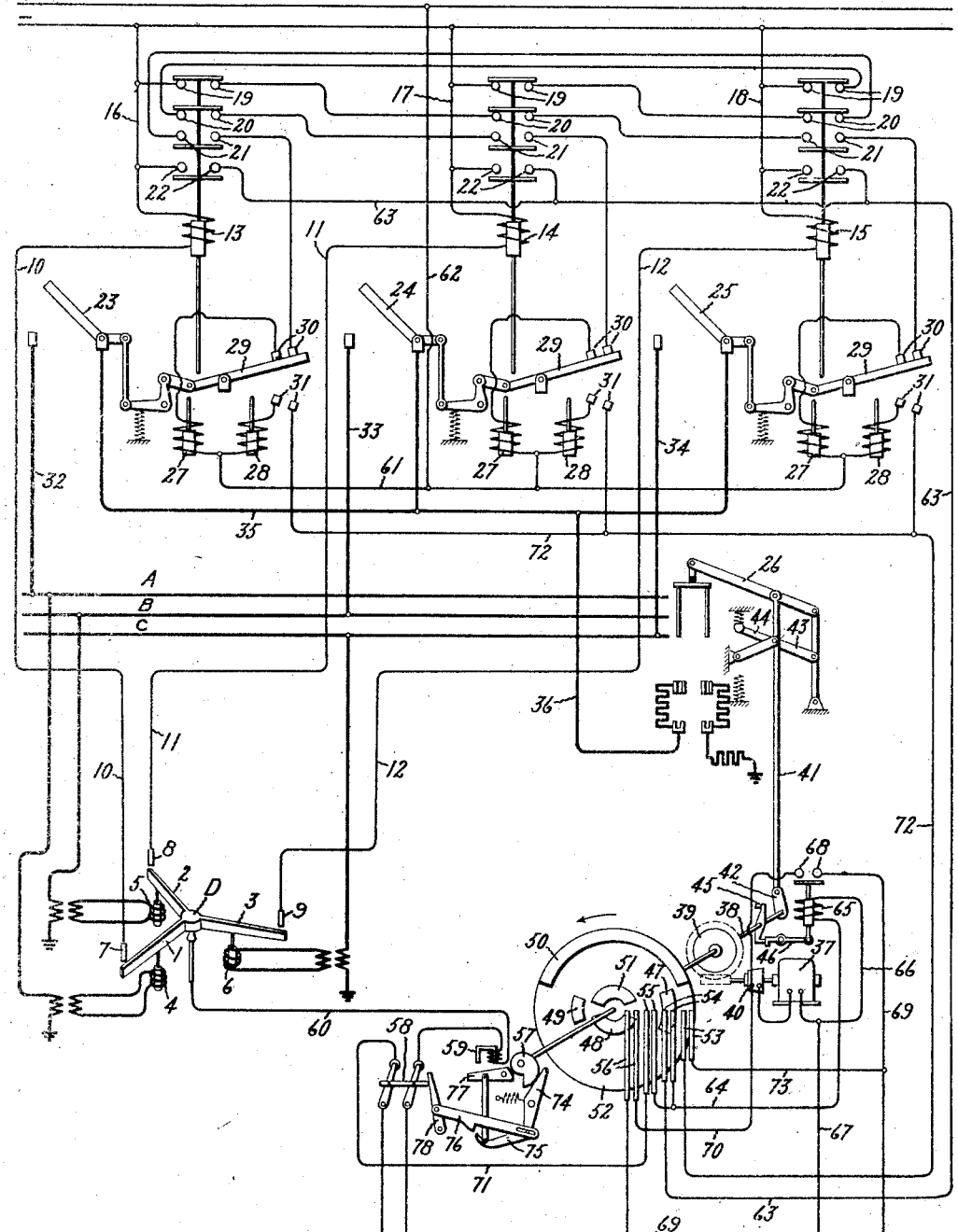

RICHARD H. MARVIN, OF SCHENECTADY, NEW YORK, ASSIGNOR TO GENERAL ELECTRIC COMPANY, A CORPORATION OF NEW YORK.

PROTECTION OF TRANSMISSION SYSTEMS.

1,247,127.  Specification of Letters Patent.  Patented Nov. 20, 1917.

Application filed April 8, 1914. Serial No. 830,533.

*To all whom it may concern:*

Be it known that I, RICHARD H. MARVIN, a citizen of the United States, residing at Schenectady, county of Schenectady, State of New York, have invented certain new and useful Improvements in Protection of Transmission Systems, of which the following is a specification.

This invention relates to the protection of transmission systems and particularly to the protection of such systems from arcing or permanent grounds. More specifically my invention relates to that type of protective device for transmission lines described and claimed in applications for Letters Patent, filed by E. E. F. Creighton, Ser. No. 492,846, filed Apr. 29, 1909, and Ser. No. 597,405, filed Dec. 15, 1910.

The object of my invention is to generally improve and simplify the type of protective device described and claimed in the above mentioned applications and commonly known as the "Creighton arcing ground suppressor".

In the applications above referred to, the arcing ground suppressor comprises an oil switch with its operating mechanism connected to each phase of the line to be protected, for completing a separate discharge path from each phase to ground. These oil switches are controlled by interlocking relays which, upon the occurrence of an arcing or permanent ground, permit only the oil switch corresponding to the faulty phase to operate, holding the other oil switches inoperative. The arcing or permanent ground is thus short circuited and removed by dead grounding the faulty phase. My invention covers an improved and simplified form of arcing ground suppressor in which a single oil switch is used in common with all the phases in the line to be protected and which is arranged to complete a common discharge path from any phase at fault to ground.

The advantages and novel features which I believe to be characteristic of my invention will be definitely indicated in the claims appended hereto; the features of construction and mode of operation will be understood by reference to the following description taken in connection with the accompanying drawing which shows diagrammatically, a transmission system provided with a protective device embodying the novel features of my invention.

In the drawing, the transmission line is shown as comprising, for example, three phases having conductors A, B, and C. Connected to the transmission line is a ground indicating or phase selective device which operates to select the phase or the conductor of the line, upon which a ground has developed. This device comprises, a movable member D having three contact arms 1, 2, and 3, the movable member being mounted, at its center, in any suitable manner, so that any of the arms or any two of the arms may be simultaneous moved upward or downward. Acting upon the arms 1, 2, and 3, are solenoids 4, 5, and 6 respectively, which are energized from the secondaries of separate potential transformers, the primaries of which are connected between ground and the conductors A, B, and C respectively. Mounted in the path of upward movement of the arms 1, 2, and 3, are contacts 7, 8, and 9, respectively, which close external control circuits through the movable member D when the phase selected device operates. The control circuits from 7, 8, and 9 are completed through the conductors 10, 11, and 12 respectively to the interlocking relays 13, 14, and 15 respectively, and through conductors 16, 17, and 18 respectively, to the negative conductor, as indicated, of an external source of current. These circuits thus form energizing circuits for the interlocking relays controlled by the operating of the phase selective device.

The interlocking relays each control four sets of contacts, namely, the contacts 19, 20, 21, and 22, the contacts 19, and 20, being the interlocking contacts for the auxiliary switches. When relay 13 operates, for instance, it opens its contacts 19 and 20 which open the control circuits of auxiliary switches 24 and 25 and when relay 14 operates, it opens its contacts 19 and 20 which in turn opens the control circuits of auxiliary switches 23 and 25. The contacts 21 of each relay operate the control circuits of the auxiliary switches 23, 24 and 25 respectively, and contacts 22 of each relay are in parallel relation and control the operation of the main switch 26.

The auxiliary or disconnecting switches 23, 24 and 25 are operatively related to the interlocking relays 13, 14 and 15, respectively, and have the well known type of toggle operating mechanism controlled by closing coils 27 and opening coils 28. The switches are also provided with bridging members 29 which, in one position, close contacts 30 in the circuits of the closing coils 27 and, in another position, close contacts 31 in the circuits of the opening coils 28. These auxiliary switches 23, 24 and 25, in closing, connect the conductors A, B, and C respectively, through conductors 32, 33, and 34 respectively to the common conductor 35. This common conductor 35 is connected to ground through conductor 36 by the closing of the main or grounding switch 26. This grounding switch 26, in closing, connects the conductors 35 and 36 to ground first through a resistance and then directly to ground, by short-circuiting the resistance. When any one of the auxiliary switches 23, 24, and 25 closes, it connects its corresponding conductor A, B, or C and therefore its corresponding phase, to the common conductor or discharge point 35 and when the main switch 26 closes, this common discharge point is connected to ground, thus forming a common discharge path from any conductor of the transmission line to ground.

The main switch 26 is motor operated and preferably of the type having contacts broken in oil. In the type of arcing ground suppressor described and claimed in the aforementioned applications, separate discharge paths to ground were provided for each phase of the line to be protected thus necessitating the expense of an oil switch with its operating mechanism for each phase and interlocking means for allowing only the oil switch corresponding to the faulty phase to operate. By my invention I simplify and improve the type of arcing ground suppressor heretofore mentioned by providing only a common oil switch 26 which is arranged to complete a common discharge path to ground from any conductor of the transmission line upon which an arcing or permanent ground has developed, thus dead grounding the faulty conductor and removing the ground by short circuiting it.

The oil switch 26 is operated by a motor 37 which rotates a shaft 38 by means of a worm driven wheel 39 mounted upon the shaft 38 and driven by the motor through a magnetic clutch 40. A rod 41 is attached to a crank arm 42 which is securely mounted upon the shaft 38 and by the rotation of the shaft, the oil switch 26 is moved into and out of circuit closing position. The rod 41 is guided in its movement by a system of toggle levers 43. One lever 44 of this system is adapted to engage with springs at the upper and lower limits in the movement of the switch, so that a quick break and an initial movement may be obtained independently of the motor 37. These springs also have a cushioning effect upon the operation of the switch. Upon the shaft 38 is also securely mounted a restraining arm 45 which normally engages with the free end of lever 46 and prevents the rotation of the shaft in counterclockwise direction. The shaft also carries contact bridges 47, 48, 49, 50 and 51 conveniently mounted upon a disk 52 and so positioned as to bridge the contact fingers 53, 54, 55, and 56 at predetermined periods and maintain the operation of the motor 37 and open and close the proper auxiliary switch in proper sequence with the main switch. Mounted upon the shaft 38 is also a cam 57 which operates a locking device to prevent further rotation of the shaft 38 after the main switch 26 has moved into closed position for the second time. The operation of this so-called "second stroke lock device" and the sequence of operation for the oil switch mechanism will be better understood by the description of the operation of my simplified and improved protective device.

The operation of the arcing ground suppressor embodying the following features of my invention may be described as follows: under normal operating conditions upon the transmission line, the movable member D of the phase selective or ground indicating device is balanced, as the pull exerted by the solenoids 4, 5, and 6 upon the arms 1, 2, and 3 respectively, is equal. The interlocking relays 13, 14, and 15 are deënergized and the auxiliary switches 23, 24, and 25 are open, as is also the common oil switch 26 as shown in the drawing. Assume a ground has developed upon one phase of the transmission line, for instance, upon the phase corresponding to conductor A. Due to this fault the current flow in conductor A is greatly reduced, and hence the pull exerted by solenoid 4 upon arm 1 is lessened. The result is that the solenoids 5 and 6 overpower solenoid 4 and pull their respective arms 2 and 3 down, which consequently raises arm 1 into engagement with its contact 7. When this happens, interlocking relay 13 corresponding to the conductor A, is energized through an external circuit starting at the plus bus, through one arm of switch 58, holding relay 59, conductor 60, to the movable member D of the phase selective device, thence through contact 7, conductor 10, interlocking relay 13, and conductor 16 to the negative bus. The holding relay 59 is thus energized as is also interlocking relay 13 which now raises its plunger to open contacts 19 and 20 and to close contacts 21 and 22. Contacts 19, and 20 upon opening, prevent the operation of auxiliary switches 24 and 25, corresponding to the conductors B and C respectively. Contacts 21 upon closing, close the control circuit of auxiliary switch 23 corresponding to the faulty conductor A. This circuit starts from the negative bus of the external circuit, through contacts 19 of relay 14, contacts 20 of relay 15 and contacts 21 of relay 13, to contacts 30 of auxiliary switch 23, which are closed by the bridging member 29 and thence through the closing coil 27 of the auxiliary switch 23, conductor 61 and conductor 62 to the positive bus. The closing coil 27 for the auxiliary switch 23 is thus energized and raises its plunger which operates upon the toggle and link mechanism to move the switch 23 into closed position, connecting, thereby, the faulty conductor A through conductor 32 to the common conductor 35. As switch 23 closes, the bridging member 29 breaks engagement with contacts 30 thus deënergizing the closing coil 27, and closing contacts 31. Due to the closed position of the switch mechanism, the plunger of the interlocking relay 13 is held up mechanically even though its energizing circuit might be broken at contact 7 if the ground was of very short duration.

At the same time that the circuit is completed through contacts 21 to operate the auxiliary switch 23, the contacts 22 close a circuit through the operating mechanism of the main oil switch 26 as follows: from the negative bus, through contacts 22, conductor 63, contact fingers 54, which are bridged by the contact bridge 47, thence along conductor 64, through the control relay 65, conductor 66, and conductor 67 to the positive bus. This circuit energizes the control relay 65 which raises its plunger to close contacts 68 which, in turn, complete a circuit through the motor 37 as follows: from the positive bus along conductor 67, through motor 37, magnetic clutch 40, contacts 68 and conductor 69, to the negative bus. This circuit starts the motor 37 which rotates the shaft 38 through the worm driven wheel 39 in a counterclockwise direction. As the control relay 65 is energized when the motor 37 starts, the free end of lever 46 is withdrawn from the path of restraining member 45, and the shaft 38 is thus free to rotate. As the shaft 38 rotates, the contact bridge 47 opens the circuit through contact fingers 54 breaking the energizing circuit through control relay 65 and allowing the relay plunger to fall thus breaking also the circuit through contacts 68. The oil switch proper 26 is now moving into closing position. Just before the contact bridge 47 opens the circuit through contact fingers 54, contact bridge 48 closes a circuit through contact fingers 56 which continues the operation of the motor 37 by completing a circuit as follows; from the negative bus through contact fingers 56 bridged by contact bridge 48, conductor 70, magnetic clutch 40, motor 37 and conductor 67 to the positive bus. When the circuit through the contact fingers 56 is broken, a circuit through contact fingers 55 is completed as follows: from the negative bus through one arm of switch 58, conductor 71, to contact fingers 55, thence along conductor 64, through the control relay 65, conductor 66 and conductor 67 to the positive bus. When this circuit through contact fingers 55 is made, the shaft 38 has completed one-half a revolution and the oil switch 26 has closed, connecting the common conductor 35 and the conductor 38 to ground first through a resistance and then directly to ground by short circuiting the resistance. The circuit through the auxiliary switch 23 is arranged to be completed so that the faulty conductor A is connected to the common conductor 35 just before the oil switch 26 closes and connects the common conductor 35 to ground. The oil switch 26 thus dead grounds the faulty conductor A through the common discharge path comprising conductors 35 and 36, and short circuits the arcing or permanent ground and if the ground is of the arcing character, extinguishes it.

As the oil switch 26 is now closed and as the fault upon the conductor A has been removed, it is now necessary to open the common oil switch 26, break the common discharge path to ground and return the conductor A to normal operative condition. In opening the common discharge path to ground, the auxiliary and main switches 23 and 26 open in reverse sequence than in closing, that is, the common oil switch 26 first opens and then the auxiliary switch 23 operates in a manner to be more fully described. As the operating mechanism for the oil mechanism has rotated the shaft 38 so as to complete one-half a revolution, the restraining member 45 is again in a position to restrain further rotation of the shaft. This is prevented by the closing of the circuit through contact fingers 55, above described which again energizes the control relay 65 and causes it to raise its plunger and move the lever 46 from the path of the restraining member 45. This circuit through the contact fingers 55 being completed, keeps the motor 37 in operation, as the control relay 65 closes contacts 68 and completes the circuit through the contact fingers 56 as before described but this time the contact fingers are bridged by the contact bridge 51. At the same time that the circuit through the contact fingers 56 is completed, a circuit through the contact fingers 53 is completed from the positive bus through conductor 62, opening coil 28 of auxiliary switch 23, contacts 31, conductor 72, through contact fingers 53 which are now bridged by the contact bridge 50, through conductor 73, to conductor 69 and the negative bus.

The completion of this circuit energizes the opening coil 28 of the auxiliary or disconnecting switch 23 thus opening it and moving the bridging member 29 from engagement with contacts 31 to engagement with contacts 30. Before the auxiliary switch opens, however, the common oil switch 26 has first opened, due to the continued rotation of the shaft 38, opening the common discharge path to ground. Now that the shaft 38 has completed one revolution, the common discharge path from the faulty conductor A has been closed and opened again through the oil switch 26. If the ground is not of a permanent nature, the short circuiting of the fault by the dead grounding of the conductor, removes the ground and normal operation is resumed upon the conductor. This means that the movable member D of the phase selective device is again normally balanced and the interlocking relay returns to normal de-energized condition when the auxiliary switch 23 opens. There is, therefore, no way to complete a circuit through the motor 37 and the oil switch is, therefore, held open.

If, however, the ground is permanent in character, it cannot be removed by short circuiting in the manner described and when the auxiliary switch 23 opens, the ground still persists, causing the movable member D of the phase selective device to still remain unbalanced and its interlocking relay to be still energized. The same procedure of operation as above described is, therefore, repeated to complete the normal discharge path to ground through the oil switch 26. When the oil switch closes the second time to dead ground the faulty conductor A, it is locked in closed position against further opening by a locking device to be more fully described, thus maintaining the faulty conductor dead grounded until the fault can be repaired.

The device which locks the oil switch closed upon its second closing stroke operates as follows; the cam 57 which is securely mounted upon the shaft 38 rotates with it in counter clockwise direction. The position of the cam in the drawing is shown when the shaft starts its initial rotation. As the main switch closes, the cam 57, in rotating, moves over the lever 74 and the catch 75, the pivot between the levers 74 and 75 sliding freely in the slotted end of the link 76 because the lever 77 is now down, holding catch 75 out of engagement with the link 76. As the main switch opens, the cam 57 engages the lever 77 and moves it up to the magnet 59, at the same time raising catch 75 into engagement with link 76. If the ground has been cleared from the conductor A when the main switch 26 opens, the circuit through the magnet 59 is broken, as the movable member D of the phase selective device is then balanced and the lever or armature 77 therefore drops back with the catch 75, into normal position when the cam 57 passes. If, however, the ground still persists when the main switch 26 opens, the circuit is still completed through the magnet 59 as the movable member D is still unbalanced and holds the circuit closed. The lever 77, is, therefore, held up by the magnet 59, and the catch 75 is, thereby, held in engagement with link 76. When the main switch 26 closes for the second time, cam 57 moves as before, against lever 74 but this time the catch 75 is in engagement with link 76 and the movement of the lever 74 is transmitted to catch 75 which moves the trip lever 78 about its pivot to open the switch 58, thus opening the circuit through the contact fingers 55 of the main switch operating mechanism and breaking the circuit through the phase selective device and interlocking relay 13. The main switch is thus held closed and the faulty conductor A is dead grounded until the switch 58 is again closed by hand or by any suitable relay device.

My invention may be embodied in other forms than that shown and described, and I, therefore, do not wish to be restricted to the precise construction shown, but intend to cover in the appended claims all changes and modifications which are within the spirit of my invention and will be apparent to those skilled in the art.

What I claim as new and desire to secure by Letters Patent of the United States, is:—

1. The combination with a transmission line, of an electro-responsive device for automatically selecting the phase of said line upon which a fault occurs, a grounding switch forming a common discharge path from any phase of said line to ground, and means responsive to said electro-responsive device for connecting only the selected faulty phase to the common discharge path.

2. The combination with a transmission line, of a relay responsive to a ground upon said line for automatically selecting the phase grounded, a dead grounding switch for closing a common discharge path from any phase of said line to ground, and an interlocking relay responsive to said first mentioned relay for automatically connecting the grounded phase to said common discharge path and simultaneously preventing the other phases from being so connected to said path.

3. The combination with a transmission line, of an arcing ground suppressor comprising, an electro-responsive device for selecting the phase of said line upon which a ground occurs, an oil switch forming a common discharge path from any phase to ground, auxiliary switches for connecting any phase of said line to said common discharge path, and means responsive to said electro-responsive device for operating the auxiliary switch corresponding to the grounded phase and holding the auxiliary switches corresponding to the other phases inoperative.

4. The combination with a transmission line, of an arcing ground suppressor comprising a phase selecting device responsive to a grounded condition upon any phase of said line, auxiliary switches for connecting each of said phases to a common discharge point, a main switch for connecting said common discharge point to ground, and electroresponsive means energized by said phase selecting device for operating the auxiliary switch corresponding to the grounded phase and holding the other auxiliary switches inoperative.

5. The combination with a transmission line of an electro-responsive device for automatically selecting the phase upon which a fault occurs, auxiliary switches for connecting the selected phase to a common conductor, and a main switch for connecting said common conductor to ground, means responsive to said electro-responsive device for operating only the auxiliary switch corresponding to the faulty phase, and means for opening and closing said main and auxiliary switches in a definite sequence.

6. The combination with a transmission line, of a ground indicating device responsive to conditions upon each phase of said line, a common oil switch for completing a circuit from any phase at fault to ground, disconnecting switches for connecting each phase to the circuit through said common oil switch, relays for each phase responsive to said ground indicating device for operating said disconnecting switches, said ground indicating device operating to energize only that relay corresponding to the phase at fault, said relay in turn causing only its respective disconnecting switch to operate thereby dead grounding the phase at fault, and means operatively related to said relay for operating its disconnecting switch and said common oil switch in sequence.

7. The combination with a transmission line, of an arcing ground suppressor comprising an electro-responsive device for selecting the phase of said line upon which an accidental ground occurs, a main switch for metallically grounding any of said phases through a common discharge path, auxiliary switches for conecting any phase of said line to said common discharge path, an interlocking relay responsive to said electro-responsive device for causing the operation of the auxiliary switch corresponding to the accidentally grounded phase and for holding said auxiliary switches corresponding to the other phases inoperative, means for closing the proper auxiliary switch and the main switch in sequence then opening said switches in sequence and if the accidental ground is still upon the phase for closing said switches a second time, and a locking device for holding said switches closed upon their closing the second time.

In witness whereof, I have hereunto set my hand this 7th day of April, 1914.

RICHARD H. MARVIN.

Witnesses:
BENJAMIN B. HULL,
MARGARET E. WOOLLEY.

Copies of this patent may be obtained for five cents each, by addressing the "Commissioner of Patents, Washington, D. C."